Nov. 1, 1938.  H. PINARD  2,135,291
PIVOTED AXLE FOR MOTOR VEHICLES
Filed Jan. 12, 1938  3 Sheets-Sheet 1
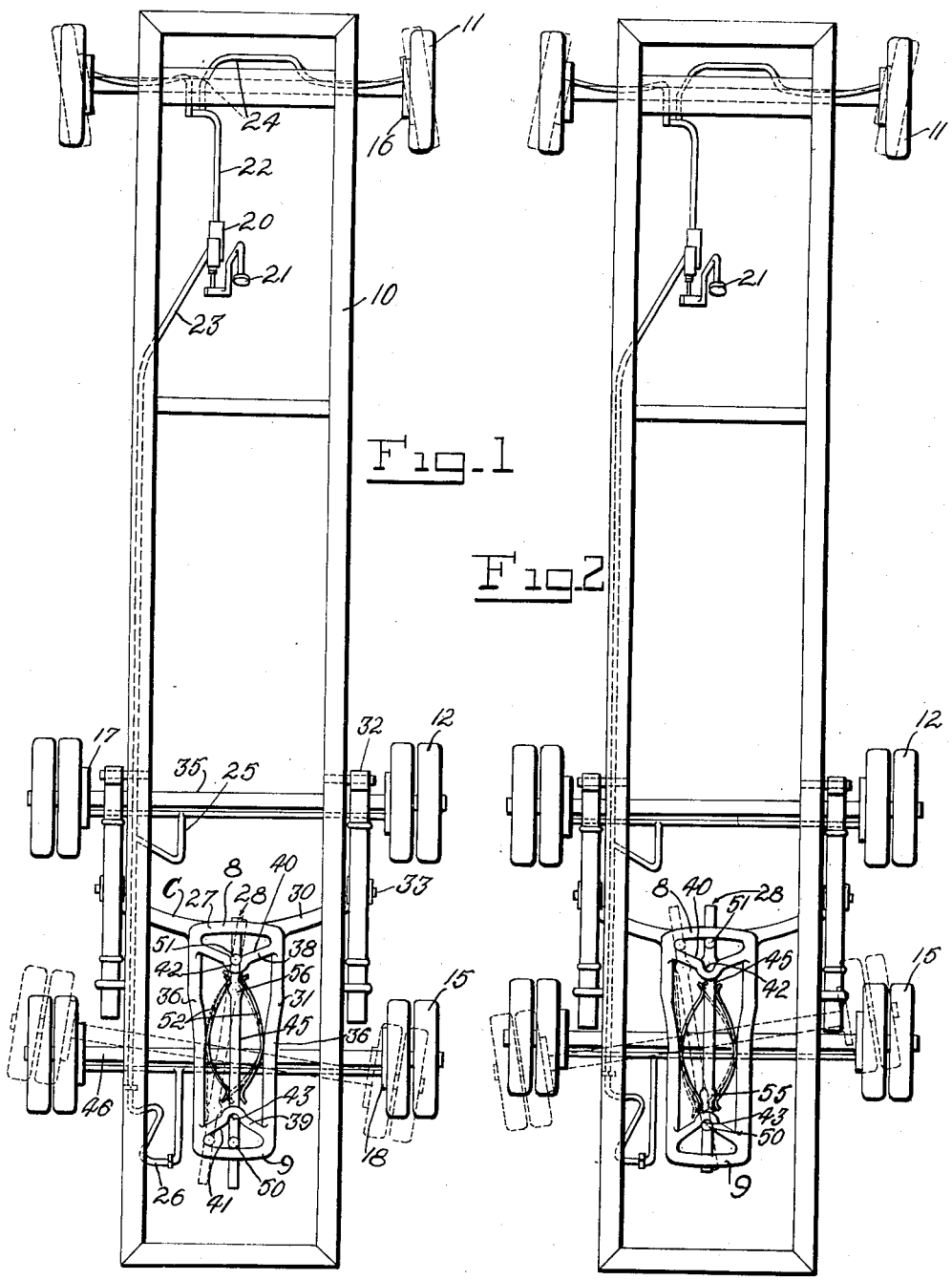

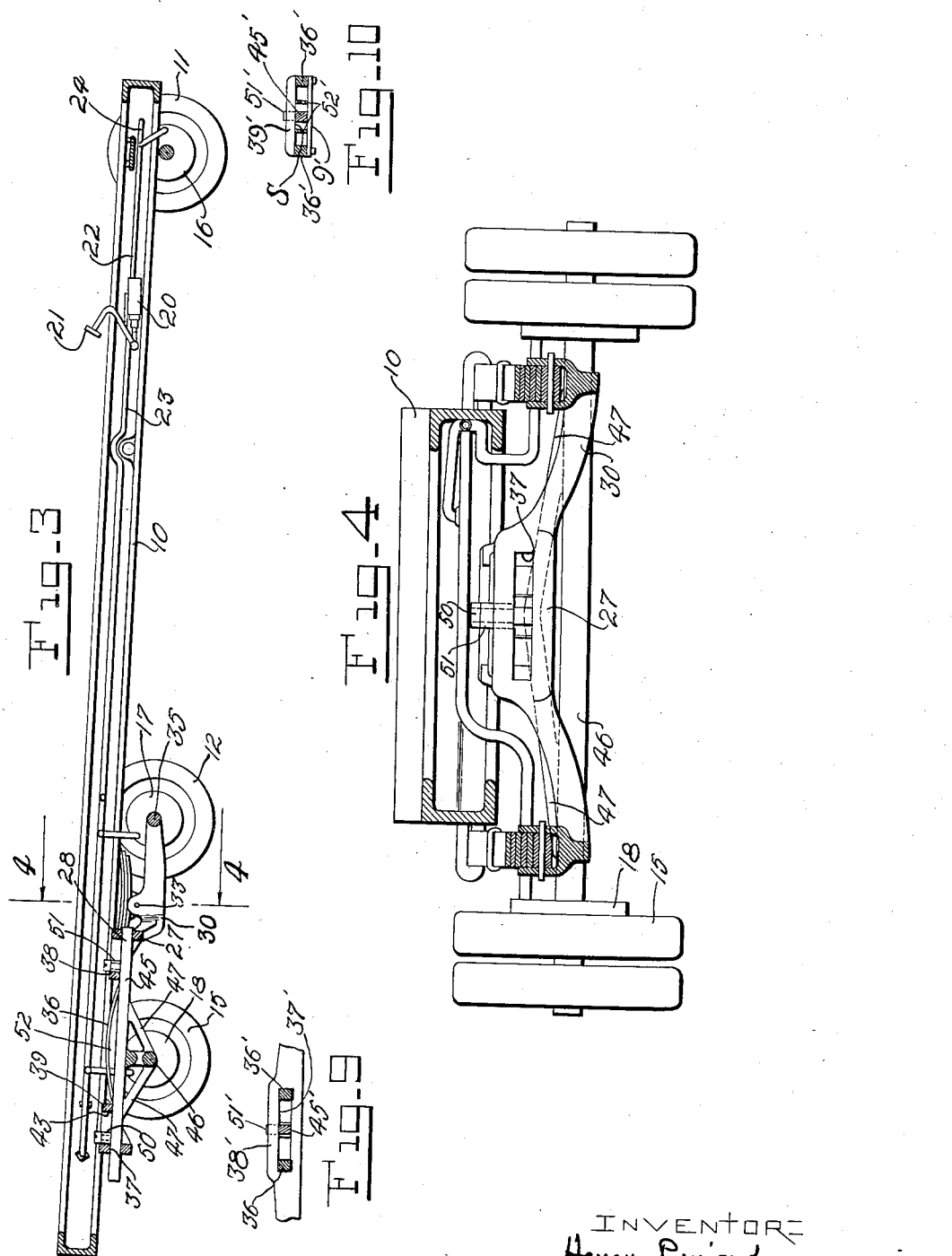

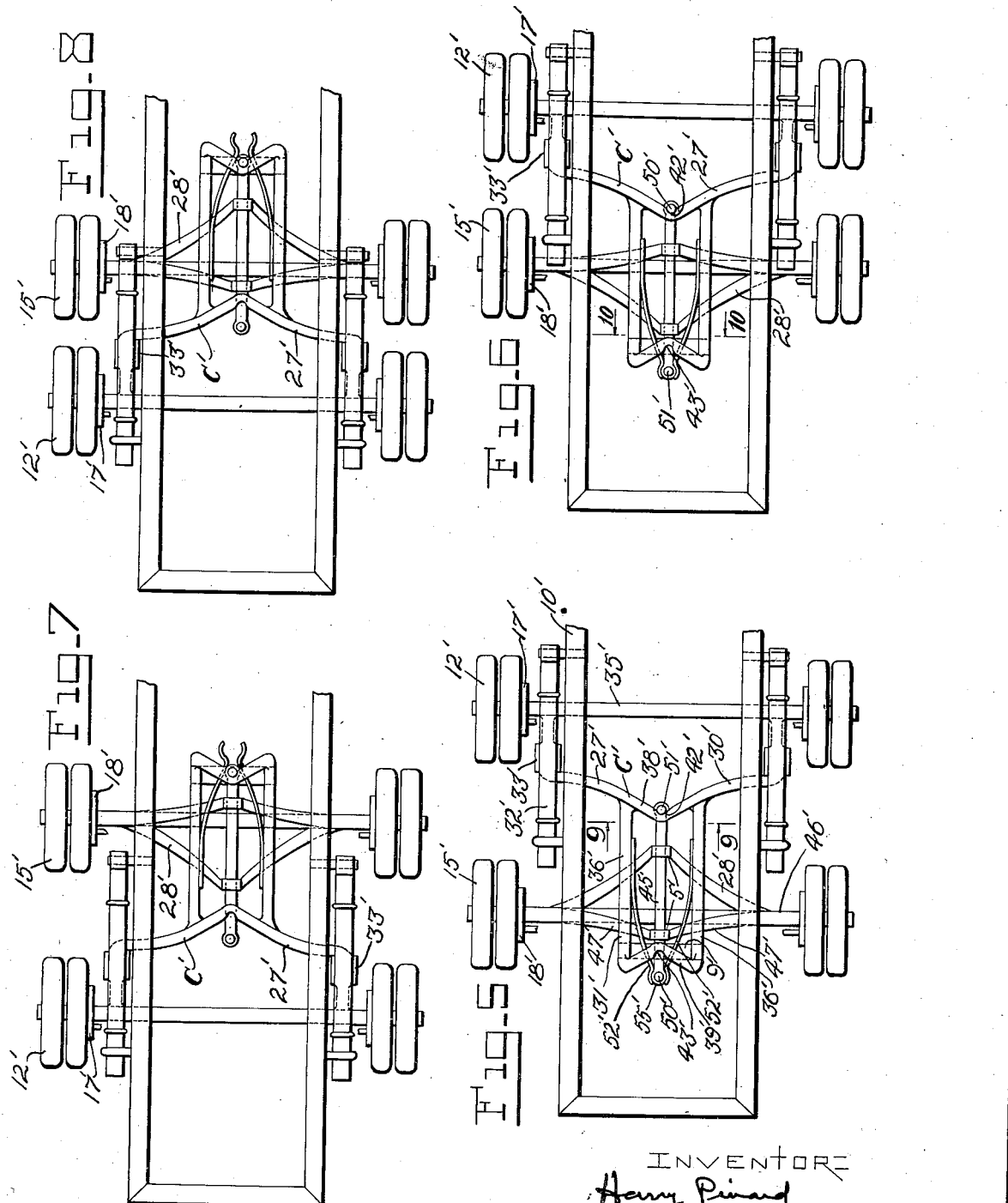

Patented Nov. 1, 1938

2,135,291

UNITED STATES PATENT OFFICE 2,135,291

PIVOTED AXLE FOR MOTOR VEHICLES

Henry Pinard, Manchester, N. H.

Application January 12, 1938, Serial No. 184,624

10 Claims. (Cl. 280—97)

In motor vehicles for carrying heavy loads, such as motor trucks for carrying large quantities of merchandise, it has been common practice to provide the vehicle with an auxiliary set of wheels in back of the usual rear wheels to receive part of the load. Vehicles provided with such auxiliary wheels are difficult to steer and produce forces which subject parts of the vehicle to great strain when the vehicle is moving in a curved path. The reason for this is simple. In a vehicle having only the usual front and rear sets of wheels, the rear portion of the vehicle tends to pivot about the point of contact of one of the rear wheels with the ground when the vehicle is traveling in a curved path. This is made possible by the differential which permits one of the rear wheels to rotate at a greater speed than the other. This same action takes place in a vehicle having an auxiliary set of wheels in back of the rear wheels but, since the rear portion of the vehicle cannot pivot simultaneously about two points, the auxiliary set of wheels are dragged laterally of the vehicle when the latter is moved in a curved path. This dragging of the auxiliary wheels opposes any force tending to change the direction of movement of the vehicle from a straight path to a curved path.

My co-pending application, Serial No. 140,108, filed May 1, 1937, describes a vehicle having a set of auxiliary wheels in back of the rear wheels and which is constructed so as to facilitate steering of the vehicle and to eliminate other objections to previous constructions. This was accomplished by the provision of means permitting the axle of the auxiliary wheels to pivot about a point in front of such axle when the vehicle was moving forward and to pivot about a point in back of such axle when the vehicle was moving rearward. In the construction specifically illustrated in my above mentioned application, manually operable mechanism is provided for shifting a frame for controlling the point about which the axle of the auxiliary wheels could pivot.

My present invention contemplates a construction of the same general character. In accordance with the present invention, however, the point about which the axle of the auxiliary wheels may pivot is controlled by the direction of movement of the vehicle.

These and other features of the invention will be more clearly understood from the following description in conjunction with the accompanying drawings: in which, Figs. 1 and 2 are plan views of a motor truck chassis embodying the invention and showing the parts in different operative positions;

Fig. 3 is a longitudinal sectional view of the same;

Fig. 4 is a sectional view taken upon the line 4—4 of Fig. 3;

Figs. 5, 6, 7 and 8 are fragmentary plan views of a modified construction showing the parts in different relations; and Figs. 9 and 10 are sectional views taken on the lines 9—9 and 10—10 of Figs. 5 and 6, respectively.

The invention is illustrated in the accompanying drawings as applied to a motor truck chassis which comprises a chassis frame 10 supported upon the usual sets of front wheels 11 and rear wheels 12. The chassis is supported also by a set of auxiliary wheels 15 positioned in back of the set of rear wheels 12. The front wheels 11, rear wheels 12 and auxiliary wheels 15 are provided with brakes 16, 17 and 18, respectively. The brakes may be operated by any brake operating mechanism and, as illustrated, are operated by a hydraulic system comprising a compression cylinder 20 actuated by the usual brake operating pedal 21. Fluid pressure conduits 22 and 23 extend forwardly and rearwardly respectively from the compression cylinder 20. The conduit 22 is connected by flexible conduits 24 with the front wheel brakes 16 and the conduit 23 is connected by flexible conduits 25 and 26 with the rear wheel brakes 17 and the auxiliary wheel brakes 18, respectively.

The sets of rear wheels 12 and auxiliary wheels 15 form part of a carriage C which is arranged to pivot (as described hereinafter) relative to the other part of the chassis. The carriage C includes two relatively movable frames 27 and 28. The frame 27 comprises a yoke 30 and a platform 31. The arms of the yoke 30 are pivotally connected to the rear vehicle springs 32 by pins 33. The housing 35 for the axle for the rear wheels 12 is rigidly secured in any suitable manner to the ends of the arms of the yoke 30. The platform portion 31 of the frame 27 extends rearwardly from the yoke 30 in a substantially horizontal plane and comprises a pair of spaced longitudinal frame members 36. The ends of the members 36 are connected by transverse frame members 8 and 9, each having a horizontal guide slot 37 for the frame 28. Cross members 38 and 39 connect the longitudinal frame members 36 between the transverse members 8 and 9 and are spaced from the latter an amount to provide vertical transversely extending triangularly shaped slots 40 and 41 to permit both longitudinal and transverse movement between the two frames. The cross members 38 and 39 are provided with bearings 42 and 43 respectively communicating with the slots 40 and 41 for a purpose described hereinafter.

The frame 28 comprises a plate 45 extending between and slidably movable in the slots 37 both longitudinally and transversely of the vehicle chassis. The housing 46 for the axle for the auxiliary wheels 15 is connected by struts 47 with the plate 45. A pair of pins 50 and 51 project upwardly from the top surface of the plate 45 and are spaced apart a greater distance than the bearings 42 and 43. The pin 50 is adapted to rotatably engage the bearing 43 when the pin 51 is free to move transversely in the slot 40 and the pin 51 is adapted to rotatably engage the bearing 42 when the pin 50 is free to move transversely in the slot 41. Separate leaf springs 52 are suitably secured at an intermediate point to each of the longitudinal frame members 36 so that their ends are adapted to engage opposite longitudinal edges of the plate 45 and abut the spaced enlargements 55 and 56 formed thereon to exert a resilient force tending to maintain the pin 51 in the bearing 42 or the pin 50 in the bearing 43 when these pins have been moved to such positions.

Preferably, the pins 33, which pivotally connect the carriage C to the chassis, are positioned nearer to the axle for the rear wheels 12 than to the axle for the auxiliary wheels 15 so that a greater proportion of the load carried upon the vehicle chassis is supported by the rear wheels 12 than by the auxiliary wheels 15.

When the vehicle is moving forwardly, the pin 51 will engage the bearing 42 and the pin 50 will be positioned in the slot 41 as is illustrated by the full-line position in Fig. 1. When in this position the frame 28, carrying the set of auxiliary wheels 15, is free to pivot about the pin 51 as an axis. Consequently, if the vehicle is steered to the left by turning the front wheels 11 to the dotted-line position as shown in Fig. 1, the frame 28 will pivot about the pin 51 so that the set of auxiliary wheels 15 will assume the dotted-line position as shown in Fig. 1. If the vehicle is steered so as to return the front wheels 11 to their full-line position as shown in Fig. 1, to cause the vehicle to move in a straight forward path, the frame 28 will pivot about the pin 51 so as to return the set of auxiliary wheels 15 to the full-line position as shown in Fig. 1.

If the vehicle now is stopped and its motion is started in the rearward direction, the plate 45 is shifted from the full-line position, shown in Fig. 1, to the full-line position, shown in Fig. 2, thereby bringing the pin 50 in engagement with the bearing 43 and positioning the pin 51 in the slot 40. In order to assure the shift of the plate 45 from the full-line position shown in Fig. 1 to the full-line position shown in Fig. 2, as the rearward movement of the vehicle is started, the brake pedal 21 may be depressed to apply a slight braking pressure upon the vehicle brakes. When this is done the set of auxiliary wheels 15 will move rearward at a slower rate than the vehicle inasmuch as a smaller proportion of the vehicle load is supported by the set of auxiliary wheels 15 than by the set of rear wheels 12. If the rearward movement of the vehicle continues in a straight path, the set of auxiliary wheels 15 will remain in the full-line position shown in Fig. 2. However, if the steering mechanism of the vehicle is actuated to move the front wheels from the full-line position shown in Fig. 2, to the dotted-line position so as to cause the vehicle to move in a curved path, then as the rearward movement of the vehicle continues, the frame 28 will pivot about the pin 43 as an axis to bring the set of auxiliary wheels 15 into the dotted-line position shown in Fig. 2.

It will be understood that if the pin 51 is not in engagement with the bearing 42 or the pin 50 is not in engagement with the bearing 43 when motion of the vehicle is started forward or rearward respectively, they will be moved into such respective positions by the motion of the vehicle either alone or in conjunction with the application of the vehicle brakes. Thus, it will be noted that regardless of the direction of motion of the vehicle, the frame 28 is always free to pivot about a point in front of the axle for the set of auxiliary wheels 15 with respect to the direction of motion. Inasmuch as the set of rear wheels 12 and the set of auxiliary wheels 15 are carried by a carriage which is pivotally connected to the rear vehicle springs, both of these sets of wheels will always be in engagement with the road surface whether passing over a knoll or upon the level.

In Fig. 5 there is illustrated the rear portion of a motor truck chassis embodying a modified form of the invention. This modified construction comprises a chassis frame 10' supported upon the usual set of front wheels (not shown) and set of rear driving wheels 12'. The chassis is supported also by a set of auxiliary wheels 15' positioned in back of the set of rear wheels 12'. The rear and auxiliary wheels are each provided with the usual brakes 17' and 18', respectively. The sets of rear wheels 12' and auxiliary wheels 15' form part of a carriage C' which is arranged to pivot on a transverse axis relative to the other part of the chassis.

The carriage C' includes two relatively movable frames 27' and 28'. The frame 27' comprises a yoke 30' and a platform 31'. The arms of the yoke 30' are pivotally connected to the rear vehicle springs 32' at 33'. The housing 35' for the axle for the rear wheels 12' is secured in any suitable manner to the ends of the arms of the yoke 30'. The platform 31' extends rearwardly from the yoke 30' in a substantially horizontal plane and comprises a pair of spaced longitudinal frame members 36'. The forward ends of the members 36' are connected by the V-shaped portion 38' of the yoke 30' having a horizontal slot 37'. The rear ends of the members 36' are connected by a cross member 39' and also by a member 9' so as to provide a horizontal slot S therebetween corresponding to the slot 37'. The cross member 39' and the portion 38' of the yoke 30' are shaped to provide bearings 42' and 43' respectively.

The frame 28' comprises a plate or rod 45' extending between and slidably movable in the slots 37' and S both longitudinally and transversely of the vehicle chassis. The housing 46' for the axle for the auxiliary wheels 15' is connected by struts 47' which are provided with bearings 5 which surround and rotatably engage cylindrical portions of the rod 45'. A pair of pins 50' and 51' project upwardly from the top surface of the platform 45' and are spaced apart a greater distance than the bearings 42' and 43'. The pin 51' is spaced a substantially greater distance from the axle for the auxiliary wheels 15' than is the pin 50'. The pins 50' and 51' are adapted to rotatably engage the bearings 43' and 42' respectively, the pin 50' being out of engagement with the bearing 43' when the pin 51' is in engagement with the bearing 42' and vice versa. Separate leaf springs 52' are suitably secured to each of the frame members 36' so that their free ends are adapted to engage opposite longitudinal edges of the platform 45' and abut an enlargement 55' formed thereon.

Preferably, the pivotal connections 33' between the carriage C' and the springs 32' are positioned nearer to the axle for the rear wheels 12' than to the axle for the auxiliary wheels 15' so that a greater proportion of the load carried upon the vehicle chassis is supported by the rear wheels 12' rather than by the auxiliary wheels 15'.

The operation of this structure is similar to that illustrated in Figs. 1 to 4. The important difference between the structure shown in Fig. 5 and that shown in Figs. 1 to 4 is that in the latter the pins 50 and 51 are spaced substantially equidistant from the axle for the auxiliary wheels, whereas in the structure shown in Fig. 5 the pin 51' is spaced a substantially greater distance from the axle for the auxiliary wheels 15' than is the pin 50'. This makes it possible to reverse the position of the frame 28' in the carriage C' as is illustrated in Fig. 6 so that the pin 50' is adapted to engage the bearing 42' while the pin 51' is adapted to engage the bearing 43'. By changing the position of the frame 28' from that as shown in Fig. 5 to that as shown in Fig. 6, the axle for the auxiliary wheels 15' is brought closer to the axle for the rear wheels 12' which is of advantage if it is desired to transfer the carriage C' to a shorter truck chassis. This, of course, concentrates the weight of the load upon the vehicle at points closer together upon the roadway. It will be understood, however, that even when the carriage C' is to be used on a short truck chassis, the frames 27' and 28' may bear the relationship shown in Fig. 5 and thus distribute the weight of the load upon the truck at points upon the roadway spaced farther apart. This may be of advantage where the truck is to carry an excess load and is to be driven over roadways which are apt to be injured by the concentration of heavy loads thereupon.

In certain cases it may be desirable to position the rear driving wheels 12' in back of the auxiliary wheels 15', particularly, where the truck is to be used under conditions where it is necessary to back up steep inclines. This may be brought about easily by reversing the carriage C' so that the rear wheels 12' are in back of the auxiliary wheels 15'. Fig. 7 illustrates the construction when the carriage C' has been reversed from the position shown in Fig. 5. Fig. 8 illustrates the construction when the carriage C' is reversed from the position shown in Fig. 6.

I claim:

1. In an automotive vehicle having an auxiliary set of wheels and a set of rear wheels, a pair of frames one of which is movable relative to the other longitudinally of the vehicle between two positions, said rear wheels being mounted upon one of said frames and said auxiliary wheels being mounted upon the other of said frames, and means upon said frames adapted to cooperate to permit said auxiliary wheels to swing about a point in front of said auxiliary wheels when said movable frame is in one of said positions and adapted to cooperate to permit said auxiliary wheels to swing about a point in back of said wheels when said movable frame is in the other of said positions.

2. In an automotive vehicle having an auxiliary set of wheels and a set of rear wheels, a pivotally mounted carriage having a pair of frames one of which is movable relative to the other longitudinally of the vehicle between two positions, said rear wheels being mounted upon one of said frames and said auxiliary wheels being mounted upon the other of said frames, means upon said frames adapted to cooperate to permit said auxiliary wheels to swing about a point in front of said auxiliary wheels when said movable frame is in one of said positions and adapted to cooperate to permit said auxiliary wheels to swing about a point in back of said wheels when said movable frame is in the other of said positions.

3. In an automotive vehicle having an auxiliary set of wheels and a set of rear wheels, a pivotally mounted carriage having a pair of frames one of which is movable relative to the other longitudinally of the vehicle between two positions, said rear wheels being mounted upon one of said frames and said auxiliary wheels being mounted upon the other of said frames, means upon said frames adapted to cooperate to permit said auxiliary wheels to swing about a point in front of said auxiliary wheels when said movable frame is in one of said positions and adapted to cooperate to permit said auxiliary wheels to swing about a point in back of said wheels when said movable frame is in the other of said positions, the pivotal mounting for said carriage being spaced a greater distance from the wheels carried by said movable frame than from the other set of wheels.

4. In an automotive vehicle having an auxiliary set of wheels and a set of rear wheels, a pair of frames one of which is movable relative to the other longitudinally of the vehicle between two positions, one of said sets of wheels being mounted upon said movable frame, means upon said frames adapted to cooperate to permit said auxiliary wheels to swing about a point in front of said auxiliary wheels when said movable frame is in one of said positions, and means upon said frames adapted to cooperate to permit said auxiliary wheels to swing about a point in back of said wheels when said movable frame is in the other of said positions.

5. In an automotive vehicle having an auxiliary set of wheels and a set of rear wheels, a pair of frames one of which is movable relative to the other longitudinally of the vehicle between two positions, one of said sets of wheels being mounted upon said movable frame, a pair of spaced studs carried by the last mentioned frame, the other of said frames having a pair of bearings spaced apart a distance less than the distance between said studs, one of said bearings being positioned in front and the other in back of said auxiliary wheels whereby one of said studs may rotatably engage one of said bearings when said movable frame is in one of said positions and the other of said studs may rotatably engage the other of said bearings when said movable frame is in the other of said positions.

6. In an automotive vehicle having an auxiliary set of wheels and a set of rear wheels, a pair of frames one of which is movable relative to the other longitudinally of the vehicle between two positions, one of said sets of wheels being mounted upon said movable frame, means upon said frames adapted to cooperate to permit said auxiliary wheels to swing about a point in front of said auxiliary wheels when said movable frame is in one of said positions, means upon said frames adapted to cooperate to permit said auxiliary wheels to swing about a point in back of said wheels when said movable frame is in the other of said positions, and resilient means interposed between said frames tending to resist relative movement thereof.

7. In an automotive vehicle having an auxiliary set of wheels and a set of rear wheels, a pivotally mounted carriage having a pair of frames one of which is movable relative to the other longitudinally of the vehicle between two positions, one of said sets of wheels being mounted upon said movable frame, a pair of spaced studs carried by the last mentioned frame, the other of said frames having a pair of bearings spaced apart a distance less than the distance between said studs, one of said bearings being positioned in front and the other in back of said auxiliary wheels whereby one of said studs may rotatably engage one of said bearings when said movable frame is in one of said positions and the other of said studs may rotatably engage the other of said bearings when said movable frame is in the other of said positions.

8. In an automotive vehicle having an auxiliary set of wheels and a set of rear wheels, a pivotally mounted carriage having a pair of frames one of which is movable relative to the other longitudinally of the vehicle between two positions, one of said sets of wheels being mounted upon said movable frame, a pair of spaced studs carried by the last mentioned frame, the other of said frames having a pair of bearings spaced apart a distance less than the distance between said studs, one of said bearings being positioned in front and the other in back of said auxiliary wheels whereby one of said studs may rotatably engage one of said bearings when said movable frame is in one of said positions and the other of said studs may rotatably engage the other of said bearings when said movable frame is in the other of said positions, the pivotal mounting for said carriage being spaced a greater distance from the wheels carried by said movable frame than from the other set of wheels.

9. In an automotive vehicle having an auxiliary set of wheels and a set of rear wheels, means permitting said auxiliary wheels to swing about a pivot in front of said auxiliary wheels when the vehicle is moving forward and about another pivot in the rear of said auxiliary wheels when the vehicle is moving rearward comprising a pair of frames one of which is movable relative to the other longitudinally of the vehicle between two positions, one of said sets of wheels being mounted upon said movable frame, a pair of spaced studs carried by one of said frames, the other of said frames having a pair of bearings spaced apart a distance different than the distance between said studs, said pairs of bearings and studs being arranged so that one stud may rotatably engage one of said bearings when said movable frame is in one of said positions and the other stud may rotatably engage the other bearing when said movable frame is in the other of said positions.

10. In an automotive vehicle having an auxiliary set of wheels and a set of rear wheels, a pair of frames one of which is movable relative to the other longitudinally of the vehicle between two positions, said rear wheels being mounted upon one of said frames and said auxiliary wheels being mounted upon the other of said frames, and means upon said frames adapted to cooperate to permit said auxiliary wheels to swing about a point in front of said auxiliary wheels when said movable frame is in one of said positions and adapted to cooperate to permit said auxiliary wheels to swing about a point in back of said wheels when said movable frame is in the other of said positions, said means being arranged with respect to said auxiliary wheels so that one of said points about which said auxiliary wheels may swing is closer to the axle for said auxiliary wheels than is the other of said points.

HENRY PINARD.